No. 833,936. PATENTED OCT. 23, 1906.
E. MORTERUD.
RECOVERY OF VALUABLE GASES IN THE SULFITE PROCESS.
APPLICATION FILED JAN. 8, 1906.
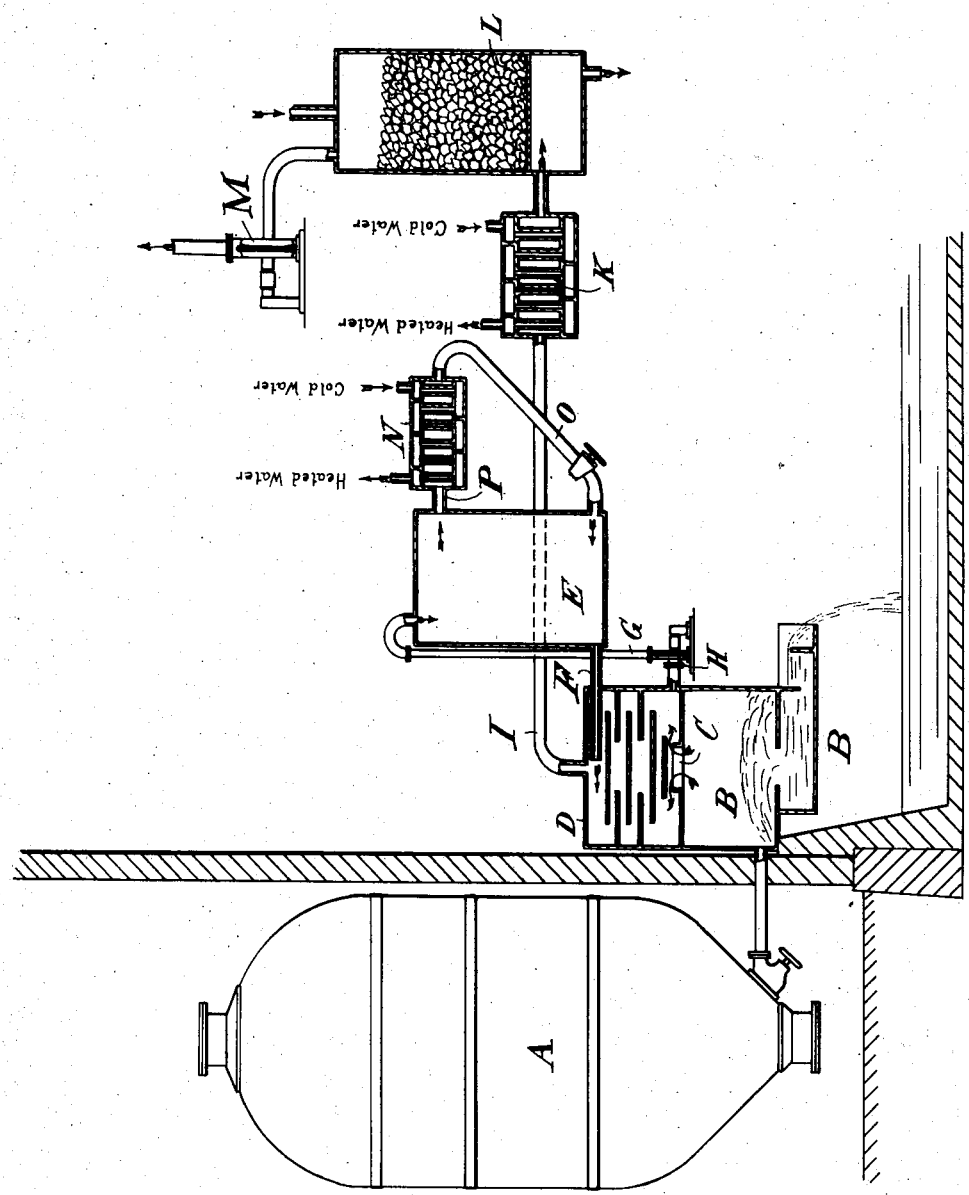
Witnesses.
H. L. Amer.
R. W. Dommers
Inventor.
Einar Morterud.
by Henry Orth Jr. atty.

UNITED STATES PATENT OFFICE.

EINAR MORTERUD, OF CHRISTIANIA, NORWAY.

RECOVERY OF VALUABLE GASES IN THE SULFITE PROCESS.

No. 833,936.      Specification of Letters Patent.      Patented Oct. 23, 1906.

Application filed January 8, 1906. Serial No. 295,140.

*To all whom it may concern:*

Be it known that I, EINAR MORTERUD, a subject of the King of Norway, residing at Christiania, Norway, have invented certain new and useful Improvements in the Recovery of Valuable Gases in the Sulfite Process; and I do hereby decare the following to be a full, clear, and exact description of the invention, such as will enable others skilled in the art to which it appertains to make and use the same, reference being had to the accompanying drawing, and to letters of reference marked thereon, which forms a part of this specification.

My invention relates to a process for regeneration of valuable gases and of heat in the manufacture of cellulose according to the sulfite process.

The digester of a sulfite-process plant when the cooking of the stock is finished contains a great deal of liquid under high pressure. When the digester is being emptied, this liquid will, to a great extent, evaporate, and the steam and the gases thereby made free will escape. In this manner considerable quantities of heat and of sulfurous acid will get lost.

According to my invention these losses are prevented by treating the contents of the digester in a peculiar manner, whereby the valuable gases may be gathered in a state relatively cold and free of steam, so that they may be utilized anew for preparation of digester solution.

The process may be carried out in the following manner: The contents of the digester or only the liquid and gaseous parts of the same are led to a vessel or a chamber to which air has not access and in which a pressure is maintained which is preferably below that of the atmosphere. In this chamber gas is liberated from the liquid and the latter is partly evaporated or converted into steam, the remaining liquid containing the incrustations and other matter dissolved during the digesting process. The next step in the process is to separate the gases from the steam and other vapors, and this is done by means of a condensing apparatus, preferably so constructed that the steam and gas are led into direct contact with water. I prefer to use a circulating quantity of water, the temperature of which is so regulated that gas is not absorbed therein to any extent worth mentioning. When the gas and steam come in contact with this water, the major part of the steam will be condensed and taken up by the water, the temperature of which will thereby be raised and the gas will leave the apparatus relatively free from steam and vapors and holding a temperature below the boiling-point of water. It may be directly utilized to produce sulfite solution, or, if desired, it may first be passed through an apparatus to be cooled somewhat more. The water circulating in the above-mentioned condensing apparatus will, during the circulation, rise in temperature from, say, 100° to 180° Fahrenheit and is afterward passed through a cooler, which takes up the absorbed heat and utilizes it for any useful purpose—for instance, in a heating or drying apparatus or for preheating the freed water of a steam-boiler or the digester solution.

In digesting processes in which solution is drawn off during the process such solution may be led into the system above described for being treated in the same manner as the waste solution.

The annexed drawing shows a diagram of a system of apparatus for carrying out my above-described apparatus.

A is a digester; B, a low-pressure chamber, into which the contents of the digester is blown when a charge has been cooked.

D is a condensing apparatus arranged on top the chamber B and corresponding with the latter through a large opening C. In the condensing apparatus shelves are arranged on which water is spread and flows down in cascades. The water enters through the pipe F, coming from the bottom part of the reservoir E, to which it is again lifted up through the pipe G by means of a centrifugal pump H. The gases leaving the condenser D through the pipe I are passed through a cooler K and thence to the absorbing apparatus L of a usual type. The top of the latter is connected with a fan M or other suction device, which maintains a suitable low pressure through the whole system.

The bottom of the chamber B opens into a channel B', provided with a water-trap, so that the stock and solution may run out successively without letting any gases escape. The water-reservoir E is, through pipes O and P, connected with a cooling apparatus N, by means of which the water used for condensing steam, and thereby raised in temperature, may, when the blowing-off period is finished, be cooled down to a suitable low temperature—say about 100° Fahrenheit—before it is again used in the condensing apparatus.

I claim—

1. In the manufacture of sulfite cellulose the process, which consists in discharging the contents of the digester or only the liquid and gaseous contents of the same into a closed chamber, in which a low pressure (about or below atmospheric pressure) is maintained, drawing off the gases and vapors formed in this chamber and passing them through a closed apparatus in direct contact with water or other suitable liquid of a suitable temperature so as to cause a condensation of the vapors and avoiding an absorption of gases and utilizing the gases so obtained in any suitable way.

2. In the manufacture of sulfite cellulose the process, which consists in discharging the contents of the digester or only the liquid and gaseous contents of the same into a closed chamber, in which a low pressure (about or below atmospheric pressure) is maintained, drawing off the gases and vapors formed in this chamber and passing them through a closed apparatus in direct contact with water or other suitable liquid of a suitable temperature so as to cause a condensation of the vapors and avoiding an absorption of gases, passing the gases leaving this apparatus through an apparatus containing absorption material for the purpose of obtaining solution for the digesting process.

3. In the manufacture of sulfite cellulose the process, which consists in discharging the contents of the digester or only the liquid and gaseous contents of the same into a closed chamber, in which a low pressure (about or below atmospheric pressure) is maintained, drawing off the gases and vapors formed in this chamber and passing them through a closed apparatus in direct contact with water or other suitable liquid of a suitable temperature so as to cause a condensation of the vapors and avoiding an absorption of gases passing the obtained heated liquid through an apparatus capable of reducing its temperature and returning the cooled liquid to the condensing apparatus for treating the next charge in the same manner.

4. In the manufacture of sulfite cellulose, the process which consists in discharging the contents of the digester, or only the liquid and gaseous contents of the same, into a closed chamber in which a suitably-low pressure is maintained, drawing off the gases and water-vapor, condensing the water-vapor without absorbing appreciable quantities of gases, and finally recovering the gases for treatment of the next charge, substantially as and for the purpose set forth.

In testimony that I claim the foregoing as my invention I have signed my name in presence of two subscribing witnesses.

EINAR MORTERUD.

Witnesses:
HENRY BORDEWICH,
AUG. OLSEN.